UNITED STATES PATENT OFFICE.

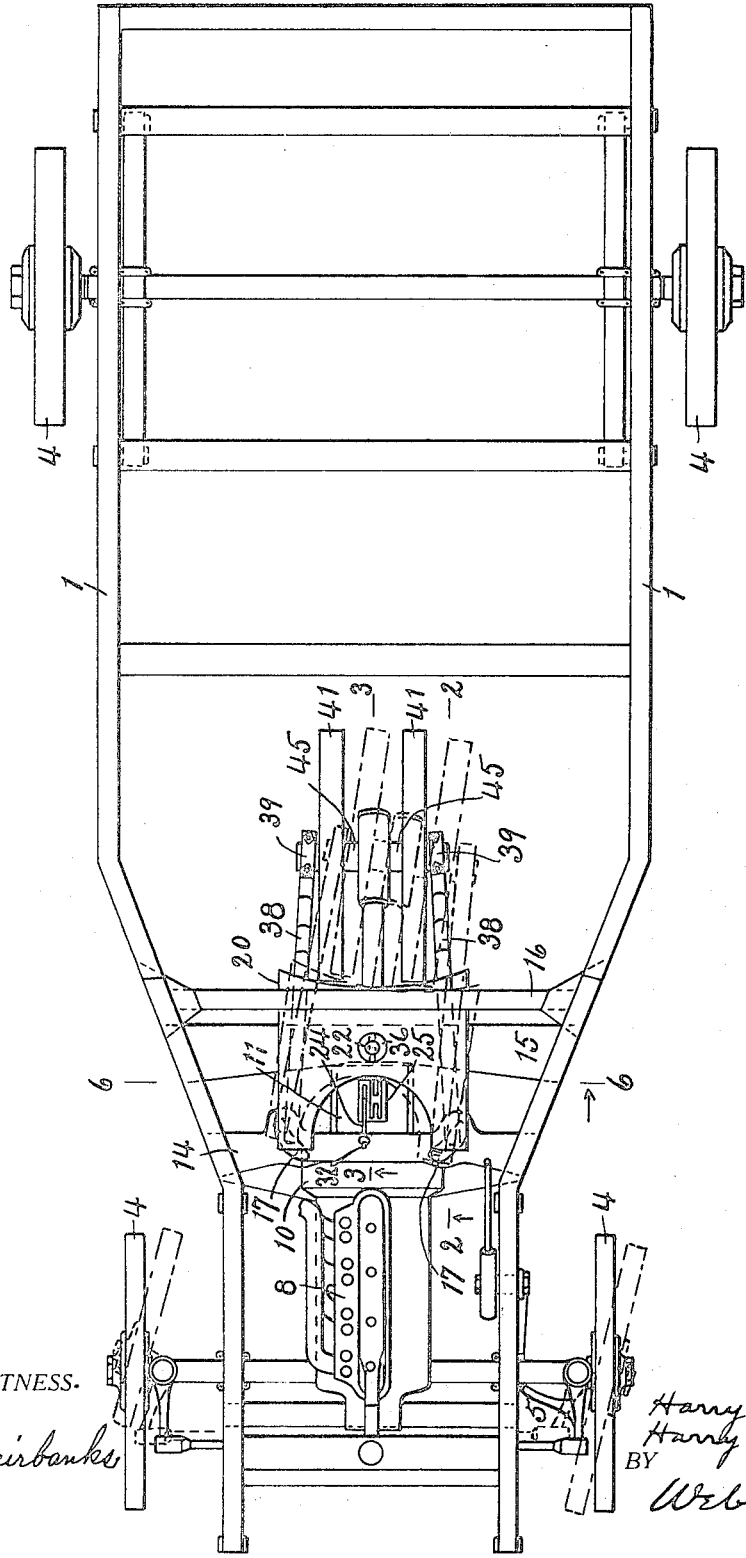

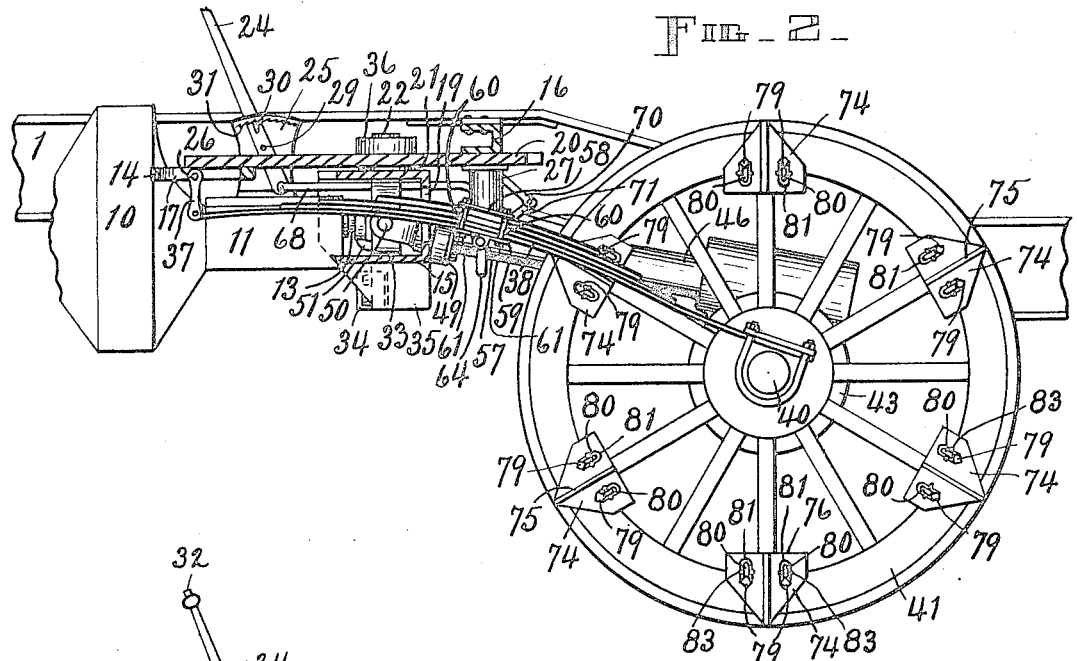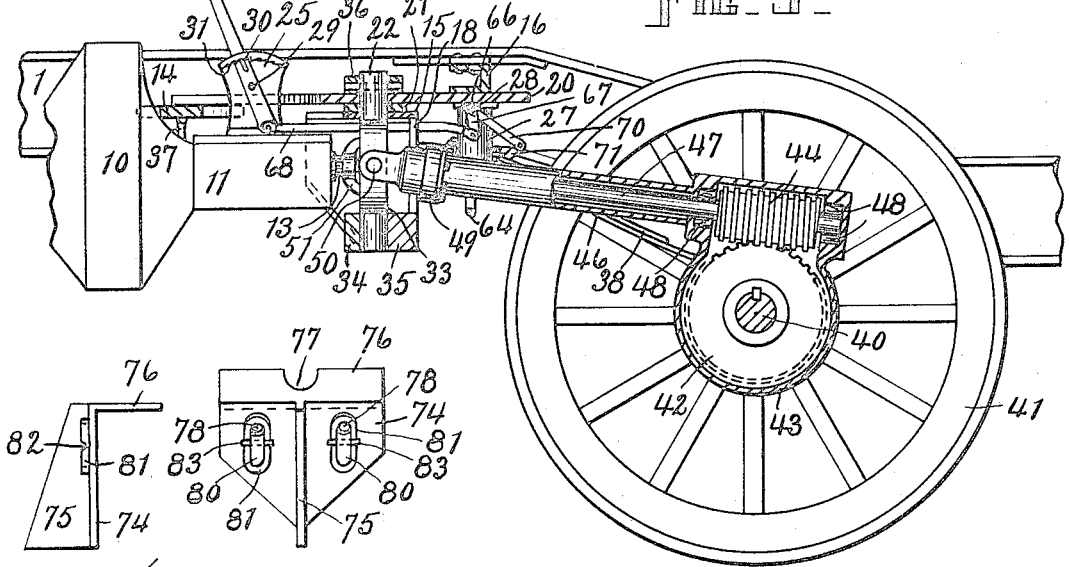

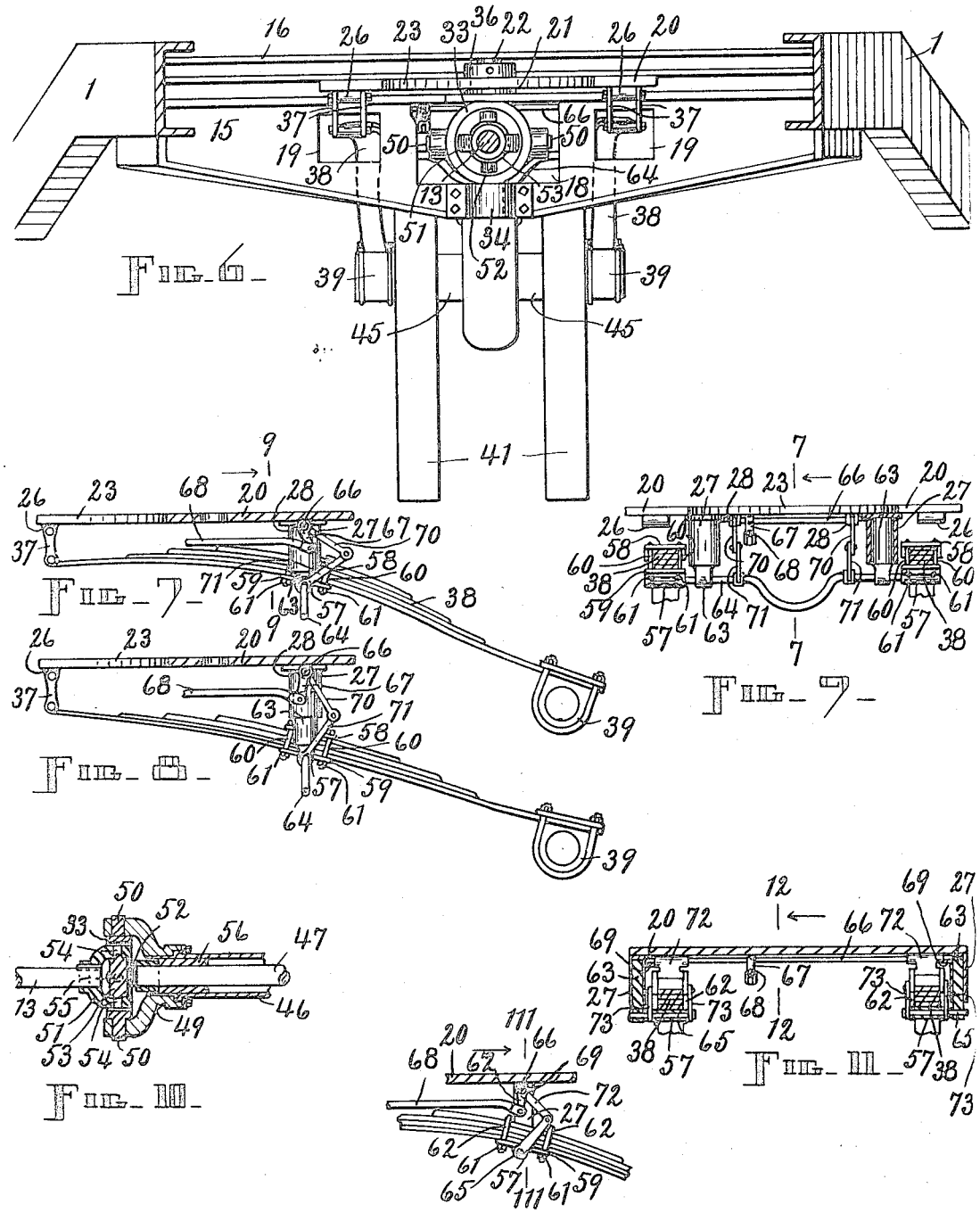

HARRY C. NAIL AND HARRY T. BARWELL, OF BROOKLYN, NEW YORK.

TRACTION DEVICE FOR MOTOR-VEHICLES.

1,189,723.  Specification of Letters Patent.  Patented July 4, 1916.

Application filed April 30, 1915. Serial No. 25,048.

*To all whom it may concern:*

Be it known that we, HARRY C. NAIL and HARRY T. BARWELL, both citizens of the United States of America, and both residents of Brooklyn, in the county of Kings and State of New York, have invented a new and useful Traction Device for Motor-Vehicles, of which the following is a specification.

Our invention relates to improvements in driving or propelling means, known as traction devices, for motor-driven vehicles, and consists in general, with a traction, friction or drive member, of certain peculiar swivel and resilient traction means and flexible driving mechanism for said member, such traction means including tension increasing and decreasing means or mechanism, together with such auxiliary and subsidiary parts and members as may be required in order to make the device complete, or desired for the purpose of increasing the serviceability and efficiency of said device, all as hereinafter set forth.

One of the principal objects of our invention is to produce a comparatively simple and inexpensive, yet entirely practicable and efficient, device for attachment to motor-driving vehicles, whereby a vehicle equipped with said device, and for which the latter is the direct traction propelling medium, is operated with less motive power and at a lower cost than where such vehicle is not so equipped.

Another object is to provide a traction device which is applicable to a low vehicle body built for handling heavy loads, the forward position of the driving or traction member and of the application of the load rendering this possible.

Still another object is to eliminate differential gears, for a vehicle equipped with our device, and thus obtain the full resistance or force of the traction, friction or drive member, or, in other words, the full resistance of the traction.

Further objects are to provide a device, of the kind specified above, which has sufficient flexibility, is so constructed that the driving or traction member always follows the front or steering wheel course and thus avoids the cramping of the vehicle and its parts, and requires no rubber in the tire or tires of said traction member, so that chains can be used thereon, as well as traction flanges in connection therewith, to prevent slipping.

Other objects and advantages will appear in the course of the following description.

A preferred form or embodiment of the invention, whereby we attain the objects and secure the advantages of the same, is illustrated in the accompanying drawings, and we will proceed to describe the invention with reference to said drawings, although it is to be understood that the form, construction, arrangement, etc., of the parts in various aspects are not material and may be modified without departure from the spirit of the invention.

In the drawings, in which like numerals designate like parts throughout the several views, Figure 1 is a top plan of the frame and running gear of a motor vehicle, and of our invention, showing the latter applied to or incorporated with said vehicle or so much thereof as is represented; Fig. 2, a detail of the traction device, taken on lines 2—2, looking in the direction of the associated arrow, in Fig. 1; Fig. 3, a similar detail, taken on lines 3—3, looking in the direction of the associated arrow, Fig. 1; Fig. 4, a side elevation of one of the traction flanges; Fig. 5, an isometric view of such flange; Fig. 6, a cross section through said device, taken on lines 6—6, looking in the direction of the associated arrow, Fig. 1; Fig. 7, a detail of one of the traction springs and the operating mechanism therefor, such detail being on lines 7—7, looking in the direction of the associated arrow, Fig. 9; Fig. 8, a detail similar to that in the preceding view, but showing said mechanism disposed to increase the tension or force of said spring; Fig. 9, a detail in cross section of said spring-operating or tension mechanism, on lines 9—9, looking in the direction of the associated arrow, Fig. 7; Fig. 10, a horizontal central section through the swivel pin and transmission and transmission-housing flexible or universal joints or connections; Fig. 11, a cross-section through a modified form of tension mechanism, on lines 111—111, looking in the direction of the associated arrow, Fig. 12, and, Fig. 12, a detail of such modification, on lines 12—12, looking in the direction of the associated arrow, Fig. 11.

In the first view, the engine or motor is represented in top plan; and the traction device is illustrated in two positions, the first of such positions being a full-line representation of said device in parallel relation with the direct course of the vehicle, and the second of such positions being a dot-and-dash line representation of said device in angular relation to said course, as when the front wheels of the vehicle are turned to the right, said wheels being thus represented also in dot-and-dash lines. All of the views, except Fig. 1 which is on a smaller scale and Figs. 4 and 5 which are on a larger scale, are drawn to the same scale.

The running-gear and steering-gear, for the vehicle frame illustrated in Fig. 1, are of usual construction, and said frame also is of usual construction and consists in part of two side beams 1. The wheels of the running-gear appear at 4, and the numeral 5 indicates the front-wheel steering-gear. On the forward part of the frame, between the beams 1, are mounted an engine or motor 8, a fly-wheel housing 10, and a transmission case 11, and a transmission shaft 13 protrudes from the back end of said case, such shaft being driven by said engine. The rear terminal of the shaft 13 appears in Figs. 2, 3, 6, and 10. The motor 8 and associated parts and members are of ordinary and well-known construction.

A cross plate 14 extends between the side beams 1, just back of the fly-wheel housing 10, or back of a part of the same, and above the forward end of the transmission-case 11, such plate being rigidly fastened at the ends to said beams. Back of the transmission case 11, is a large cross beam 15, and back of that, but on a higher level, is a smaller cross beam 16, both of said beams being rigidly secured at their ends to the side beams 1. There are two arcuate slots 17 in the plate 14, and a large central opening 18 and two smaller openings 19 in the vertical part of the beam 15, said opening 19 being adjacent to the ends of said opening 18. A horizontal swivel plate 20 is mounted on the top of the beam 15, or on an interposed washer 21, rests and turns at the front end on top of the plate 14, and operates at the rear end under the beam 16, being centered by or pivotally mounted on a vertical pin 22 supported by and in said beam 15.

The swivel plate 20 is recessed in its forward central portion, as shown at 23, to accommodate an operating lever 24 and a sector 25 therefor, and said plate is provided at the front end with a pair of lugs 26, and at the back end with a pair of hollow guide cylinders 27, such lugs and cylinders being on the underside of the plate, and said cylinders being open at their bottom ends. The right-hand cylinder 26 is shown in section in Fig. 9. There are also two pairs of lugs 28 on the underside of the plate 20 between the cylinders 27.

The sector 25 is mounted on the transmission-case 11, and the lever 24 is pivoted at 29 to said sector. These members are of the usual ratchet type, the lever 24 having a latch 30 to engage the sector teeth 31 and hold said lever at any point within the limit of its movement on the pivot 29, and a releasing rod 32 for said latch, wherewith to unlock said lever and permit the same to be swung forward at the top. Further explanation of these members is not deemed to be necessary.

The swivel pin 22, which is constructed with an approximately central annulus 33, has its upper end journaled in the top of the beam 15, and its lower end journaled in the bottom of said beam and a bearing box or cap 34 bolted to said beam over the front terminal portion of said pin, said bottom being thickened in the center, as shown at 35 in Figs. 2 and 3, to provide a strong and substantial bearing for said pin at the base and abutment for said cap. The annulus 33 fits in and operates between the top flange and the enlarged or thickened part 35 of the beam, in front of the opening 18. A collar 36 is pinned or otherwise secured to the pin 32 above the swivel plate 20. Thus it will be seen that the swivel pin is securely held in place while being left free to turn on its vertical axis, and that the swivel plate is also free to turn on or with said pin as an axis, such plate being prevented from tilting by the plate 14 and the beam 16, together with said pin and the washer 21 and collar 36.

Links 37, arranged in two pairs, are pivotally attached to the swivel-plate lugs 26 and depend therefrom, and the front end of a traction spring 38 is introduced between and pivotally attached to the lower terminals of each pair of said links. The links 37 afford swinging supports for the front ends of the two springs 38, and said springs extend rearwardly from said links, through the beam openings 19, and downwardly, being provided at their rear ends with hubs 39. The hubs 39 are mounted on a shaft or axle 40 for a direct friction member or tractor in the form of a double wheel or a pair of wheels 41. There might be more or less than two traction wheels 41. Said wheels are secured on the axle 40 and are rotated thereby, but said axle is free to rotate in the hubs 39. To all intents and purposes the two wheels 41 constitute a single traction element.

A worm-wheel 42 is secured on the axle 40, in the center thereof, and a housing 43, for said worm-wheel and a worm 44, Fig. 3, is mounted on said axle between the wheels 41, said axle being free to rotate in the housing hubs represented at 45—45 in Fig. 1. That part of the housing 43 which contains the worm 44 is at the rear end or forms the rear terminal of a tubular casing or housing 46 for a driving shaft 47, said shaft being journaled in roller-bearings 48 in said housing part and carrying said worm therein. The latter intermeshes with and drives the worm-wheel 42, and through said worm-wheel the axle 40 and the wheels 41. At the front end the tubular housing 46 is provided with a forked head 49, which extends through and operates in the opening 18, and has forwardly-projecting horizontal arms that are pivoted at 50—50 to the outside of the pin annulus 33, as best shown in Figs. 6 and 10, the pivots 50 being in line with the horizontal diameter of said annulus. Through the medium of the swivel pin 22, the tubular housing and attached and connected parts and members behind said pin are able to swing either to the right or left; and, through the medium of the pivots 50, the same parts and members are able to swing up and down. To supplement this flexible connection for the housing, a universal joint must be provided between the shafts 13 and 47, it being understood that the former shaft drives the latter shaft, and attention is called to such joint, which is best shown in Fig. 10.

The aforesaid joint is of a simple type, and consists of a fork 51 at the rear end of the shaft 13 and a fork 52 at the front end of the shaft 47, said forks being arranged with their axial or pivoted lines at rightangles to each other and located within the swivel-pin annulus 33 in the same vertical plane with a line connecting the axes of the pivots 50, a central disk 53, pivots 54 between said fork 51 and said disk, and pivots between said fork 52 and said disk, one of said last-mentioned pivots being indicated at 55 in Fig. 10. This universal joint revolves freely within the annulus 33. A bearing 56 is provided in the front end of the housing tube 46 for the shaft 47.

The springs 38 are of the leaf variety, and each is provided near the center with a clip which is provided on the bottom with a bearing 57. The clips for the springs 38 may be variously constructed, but usually consist either of upper and under plates 58 and 59, respectively, secured to said springs by side bolts 60 and nuts 61, as more fully shown in Figs. 7, 8 and 9, or double U-shaped bolts 62, fitting over the tops and extending down both sides of said springs, with the bottom plates 59 and nuts 61, as shown in Figs. 11 and 12. The bearings 57 are on the undersides of the bottom plates 59. These clips afford intermediate means of attachment for the springs 38, whereby connections are effected between said springs and the swivel plate 20, and between said springs and the mechanism by means of which the tension of said springs is increased and decreased.

The first of the above-mentioned connections is made by means of supporting and guide flanges 63—63, which operate in the cylinders 27, and either a single rod 64, which passes through the bottom protruding ends of said plungers and into the adjacent bearings 57, as clearly shown in Fig. 9, or two short rods 65, which similarly connect such plungers and bearings, as shown in Fig. 11. The springs 38 are always under some tension and the plungers 63 are normally held, by said springs acting through the rod 64 or the rods 65, with their upper ends against the tops of the cylinders 27, and at all times the weight of the load yieldingly forces the wheels 41 onto the road. The cylinders 27 are located under that part of the swivel plate that is under the beam 16, and the upward thrust imparted by the springs 38 is, therefore, received by said beam. The downward thrust imparted to the front end of the plate 20, by the springs 38 acting through the links 37, is received by the cross plate 14.

The tension mechanism for the springs 38 comprises, with the operating lever 24 and either the rod 64 or the rods 65, a rock-shaft 66, toggle connections between said rock-shaft and either said rod 54 or said rods 65, a rocker-arm 67, and a connecting-rod 68 between the lower terminals of said lever and rocker-arm. The rock-shaft 66 is journaled beneath the swivel plate 20 in the lugs 28, in one case, and beneath such plate in lugs 69 that extend inwardly from the cylinders 27, in the other case.

In the construction and arrangement herein first shown, the toggle connections above alluded to consist of a pair of rocker-arms 70 and a pair of links 71, said connections are inside of the cylinders 27 and the latter inside of the springs 38; while in the construction and arrangement shown in the last two views, said toggle connections consist of a pair of forked rocker-arms 72 and two pairs of links 73, and said last-mentioned rocker-arms, with the exception of their depending arms, are above the springs, and the cylinders are outside of the springs. The rocker-arm 67 in each case is secured to the rock-shaft 66, and the rocker-arms 70 or 72 are likewise secured to said rock-shaft. The links 71 are loosely mounted at the bottom of the rod 64, and have their upper ends pivotally connected with the lower ends of the rocker-arms 70. The links 73 in each pair are arranged on opposite sides of one of the springs 38, and said links are loosely mounted on the rods 65 and pivotally attached to the rocker-arms 72, as in the other case.

From the foregoing it will be understood that, when the lever 24 is actuated to draw the connecting rod 68 forward, the rocker-arm 67 is swung forward and rocks the rock-shaft 66 in the direction to straighten or tend to straighten the toggle connections, with the result that said connections force downward the rod 64 (or the rods 65) and with it the clips and the middle portions of the springs 38, and so decrease the curvature of said springs and cause them to exert more pressure on the wheels 41—see Fig. 8. As soon as the lever 24 is released and permitted to resume its former position, the springs 38 contract again, restore the tension mechanism to normal condition or position, and decrease the pressure on the wheels 41. The plungers 63 move down and up in the cylinders 27, as the springs 38 are expanded and permitted to contract, and guide and support the rod 64 (or the rods 65) and attached parts. During the expanding and contracting operations on the part of the springs 38, the links 37 may be swung forward and backward slightly, and the axle 40 is thrust rearwardly and drawn forwardly a little. By means of this tension-applying mechanism, any reasonable amount of force can be put upon the axle 40 and the wheels 41, and the force can most readily be regulated or graduated to meet different conditions.

The rod 64 is bowed in the center to enable said rod to pass under the tubular housing 46.

The construction shown in Figs. 11 and 12 is probably the more rigid or stable of the two, so far as the tension mechanism is concerned, but either of the constructions illustrated in connection herewith is practicable.

The wheels 41, which need not be of special construction, may be provided with or have applied thereto chains or other antiskid or non-slipping devices, such, for example, as a series of flanges 74 on one but usually on both sides of the rim of each wheel. Having reference to Figs. 2, 4 and 5, it will be seen that each flange 74 consists of a plate which is adapted to be bolted to either side of the rim of either wheel 41, has an exterior longitudinal central rib 75, and an inner lip 76 cut out at 77 to receive a spoke, and is provided with parallel longitudinally-extending slots 78 to receive the bolts 79 with which said flange is secured to said wheel rim. Each flange 74 is V-shaped at the outer end and provided with the lip 76 at the opposite or inner end, and the rib 75 is made with its outer end longer than its inner end. The flanges 74 are represented in Fig. 2 as being drawn in, with the outer ends of the slots 78 in contact with the bolts 79. This is the inoperative position of the flanges, or in any event when said flanges are in such position they are the least effective. When it is desired to increase the efficiency of the wheels 41 on slippery pavements and the like, the bolts 79 are loosened, the flanges 74 are moved outwardly until the inner ends of the slots 78 are in contact with said bolts, and the latter are retightened. The lips 76 now bear against the inside peripheries of the wheel rims, as well as engage the wheel spokes, and so add strength to the flanges. Blocks 80 are employed in the slots 78, between the bolts 79 and the ends of said slots which are opposite to said bolts, to prevent any possibility of slipping on the part of the flanges, such blocks being particularly useful when the flanges are set out. The blocks 80 have to be removed, turned end for end, and replaced, of course, each time the flanges are readjusted or reset. Each slot 78 may be surrounded or bordered, on the outside of the member 74, with a flange 81, to strengthen said member, and such flange may have notches 82 in the sides thereof to receive the protruding ends of a pin 83, with which such blocks 80 may be provided. The pins 83 serve as convenient means wherewith to remove the blocks 80 from the slots 78 whenever a change or readjustment is to be made, and to return such blocks to place. If desired, the flanges 74 may be located with their lips 76 between spokes instead of in such positions that the spokes are received in the recesses 77.

Even when the flanges 74 are inwardly disposed, as shown in Fig. 2, they serve as valuable traction aids in snow or mud, or when the road is rendered unstable by some other agency or from some other cause.

Although the general application of our invention will be quite well understood from the foregoing description of parts and explanation of their functions or operations, we will briefly describe the operation of said invention as a whole.

Through the medium of the springs 38 and their connection with the axle 40 the wheels 41 are pressed down hard on the ground, and the pressure exerted by said springs on said wheels can be varied by operating the tension mechanism, that is, the toggle connections, with the lever 24; and said axle is connected with the swivel plate 20 by said springs, and with the swivel pin 22 by the housings 43 and 46 and the head 49; consequently, when the engine 8 is set in motion and causes said wheels 41 to revolve, through the medium of the connected shafts 13 and 47, the worm 44 and worm-wheel 42, and said axle, said wheels engage the ground firmly and propel the vehicle, which latter is here represented only by the frame and running-gear. The wheels 41 may be driven backward, by reversing the engine and so propel the vehicle backward. The vehicle is steered in the usual manner, and when the front wheels 4 are turned from the direct course into a new course, if said vehicle be moving forward, the wheels 41 change from the old to the new course, the connections, including the swivel plate 20, turning on and with the pin 22 or on the axis of said pin. The connections between the rod 68 and the rocker-arm 67 and between said rod and the lever 24 must be loose enough, or said rod flexible enough, or both, to enable the turning or steering action just mentioned to take place without injuring said rod or its connections. When backing and steering, the wheels 41 do not change their course.

The maximum expanding throw of the toggle members 70 and 71 (or 72 and 73) is never sufficient to bring said members into line with each other and so permanently lock the springs 38 in expanded position and remove the control of said springs, by means of the lever 24 and intervening parts from the hand of the operator.

The lever 24 is operated to depress or expand the springs 38 and produce increased frictional or traction resistance, by forcing the traction element or the wheels 41 harder against the ground, when ascending a hill or running on smooth or slippery pavement, or to meet other road conditions and the demands of the load. The springs 38 are compelled to expand, under the force applied thereto by the toggle mechanism, because the load is too great to be displaced upwardly.

The swivel plate lugs 26 extend through the cross plate 14, and the slots 17 are provided in said cross plate to receive said lugs and permit them to move freely when said swivel plate is turned.

As hereinbefore intimated, the forward position of the traction member, and the application to such member of traction force induced by the load at a point well in advance of the transverse center thereof, together with the forward location and application of the motive power, enable us to employ a low frame and to handle a great weight with our device, and this with the minimum of consumption of fuel or other power-producing element, as will readily be understood. Another important advantage is found in the absence of more or less complicated, power-consuming, and expensive differential mechanism, no mechanism of that kind being required in this device.

What we claim as our invention, and desire to secure by Letters Patent, is—

1. A traction device comprising, with a vehicle frame, a member carried by said frame and arranged to operate on an approximately horizontal plane, a traction member, and longitudinally-extending yielding means interposed between said first-mentioned member and said traction member, with the latter at the rear terminal of said means, which means is held under compression by the load acting thereon forward of said traction member.

2. A traction device comprising, with a vehicle frame, a member carried by said frame and arranged to operate on an approximately horizontal plane, a traction member having an axle, and a yielding member connected at one terminal and intermediately with said first-mentioned member and mounted at the other terminal directly on said axle, and adapted to be expanded by the load acting through such intermediate connection.

3. A traction device comprising, with a vehicle frame, a traction member, longitudinally-extending yielding means interposed between said frame and said member, with the latter at the rear terminal of said means, which means is held under compression by the load acting thereon forward of said member, and means to vary such compression.

4. A traction device comprising, with a vehicle frame, a traction member, a yielding member connected at one terminal and intermediately with said frame and at the other terminal with said traction member, and adapted to be expanded by the load acting through such intermediate connection, and means to vary the amount of the expansion of said yielding member.

5. A traction device comprising, with a vehicle frame, a swivel member mounted on said frame on an approximately vertical axis, a traction member, and a yielding member connected at one terminal and intermediately with said swivel member and at the other terminal with said traction member, the arrangement being such that said yielding member is expanded by the load acting through such intermediate connection, and said traction member and yielding member move with said swivel member laterally upon said axis.

6. A traction device comprising, with a vehicle frame, a swivel member mounted on said frame, a traction member, a yielding member connected at one terminal and intermediately with said swivel member and at the other terminal with said traction member, the arrangement being such that said yielding member is expanded by the load acting through such intermediate connection, and means to vary the amount of the expansion of said yielding member.

7. The combination, in a traction device, with a vehicle frame, a swivel pin mounted in said frame, and a swivel plate mounted on said frame and pin, of a traction member and an axle therefor, housing members connected at one terminal with said pin and affording bearings at the other terminal for said axle, and springs connected at terminal points with said plate and said axle, and connected at intermediate points also with said plate, such springs being compressed by the load acting through said intermediate points of connection.

8. The combination, in a traction device, with a vehicle frame, and supporting member thereon, of a traction member and an axle therefor, a yielding member, a flexible connection between said yielding member at one end and said supporting member, a bearing connection between said yielding member at the other end and said axle, and an intermediate connection between said yielding member and said supporting member, the arrangement being such that the load, acting through said intermediate connection, compresses said yielding member.

9. The combination, in a traction device, with a vehicle frame, and a supporting member thereon, of a traction member and an axle therefor, a yielding member, a flexible connection between said yielding member at one end and said supporting member, a bearing connection between said yielding member at the other end and said axle, an intermediate connection between said yielding member and said supporting member, the arrangement being such that the load, acting through said intermediate connection, compresses said yielding member, and means to vary the compression of said yielding member.

10. The combination, in a traction device, with a vehicle frame, a driving shaft, a swivel pin mounted in said frame, and a swivel plate mounted on said frame and pin, of a traction member and an axle therefor, housing members connected at one terminal with said pin and affording a bearing at the other terminal for said axle, driving members in said housing members, for said traction member, a flexible connection between said driving members and said driving shaft, and springs connected at terminal points with said plate and said axle, and connected at intermediate points also with said plate, such springs being compressed by the load acting through said intermediate points of connection.

11. The combination, in a traction device, with a vehicle frame, a driving shaft, a swivel pin mounted in said frame, and a swivel plate mounted on said frame and pin, of a traction member and an axle therefor, housing members connected at one terminal with said pin and affording a bearing at the other terminal for said axle, driving members in said housing members, for said traction member, a flexible connection between said driving members and said driving shaft, and yielding means to retain said traction member forcibly on the ground.

12. The combination, in a traction device, with a vehicle frame provided with three supporting members, of a pin mounted in the intermediate of said supporting members, a swivel plate mounted on said intermediate member and said pin, and bearing on the foremost of said supporting members from above and on the rearmost of said supporting members from below, a traction member having an axle, housing members connecting said axle with said pin, and springs between said swivel plate and axle, such springs having end and intermediate connections with said plate.

13. The combination, in a traction device, with a vehicle frame provided with three supporting members, and a driving shaft, of a pin mounted in the intermediate of said supporting members, a swivel plate mounted on said intermediate member and said pin and bearing on the foremost of said supporting members from above and on the rearmost of said supporting members from below, a traction member having an axle, housing members connecting said axle with said pin, driving members in said housing members for said traction member, flexible connecting means between said shaft and said driving members, and springs between said swivel plate and axle, said springs having end and intermediate connections with said plate.

14. The combination, in a traction device, with a vehicle frame, a swivel pin mounted in said frame, such pin being provided with an annulus, and a driving shaft, of a traction member having an axle, housing members connecting said axle with said pin, driving members in said housing members for said traction member, and a flexible connection within said annulus for said shaft and driving members.

15. The combination, in a traction device, with a vehicle frame, a swivel pin mounted on said frame, such pin being provided with an annulus, a swivel plate mounted on said frame and pin, and a driving shaft, of a traction member having an axle, housing members connecting said axle with said pin, driving members in said housing members for said traction member, a flexible connection, within said annulus, for said shaft and driving members, and springs between said swivel plate and axle, said springs having end and intermediate connections with said plate.

16. The combination, in a traction device, with a vehicle frame, of a plate mounted on said frame, a traction member having an axle, springs attached at their rear ends to said axle, and connected at their front ends with said plate, guide members carried by said plate, and guide members rising from said springs into operative relation with said first-mentioned guide members.

17. The combination, in a traction device, with a vehicle frame, of a plate mounted on said frame, a traction member having an axle, springs attached at their rear ends to said axle, and connected at their front ends with said plate, toggle mechanism between said springs and said plate, and means to actuate such mechanism.

18. The combination, in a traction device, with a vehicle frame, of a plate mounted on said frame, a traction member having an axle, springs connected at their forward ends with said plate, and attached at their rear ends to said axle, co-acting guide members between said plate and springs, toggle mechanism between said plate and springs, and operating means for said mechanism.

19. The combination, in a traction device, with a vehicle frame, of a plate mounted on said frame, a traction member having an axle, springs connected at their front ends with said plate, and attached at their rear ends to said axle, said springs being provided with clips, a rock-shaft carried by said plate, toggle members operatively connected with said rock-shaft, connections between said clips and said toggle members, and means to actuate said rock-shaft.

20. The combination, in a traction device, with a vehicle frame, of a plate mounted on said frame, a traction member having an axle, springs connected at their forward ends with said plate, and attached at their rear ends to said axle, clips on said springs, said clips being provided with attaching means, a rock-shaft carried by said plate, telescoping guide members between said plate and said clip attaching means, toggle members between said rock-shaft and said attaching means, and operating means for said shaft.

21. The combination, in a traction device, of a vehicle frame, a member carried by said frame and arranged to move on an approximately horizontal plane, a traction member, means to connect said traction member with said frame, means to drive said traction member, and spring-pressure-applying means between said first-mentioned member and said traction member, said last-mentioned means being held under compression by the weight of the load applied at an intermediate point through said first mentioned member.

22. The combination, in a traction device, with the frame and running-gear of a vehicle, and a member carried by said frame and arranged to move on an approximately horizontal plane, of a traction member, means to connect said traction member with said frame, means to drive said traction member, spring-pressure-applying means between said first-mentioned member and said traction member, said last-mentioned means being held under compression by the weight of the load applied at an intermediate point through said first mentioned member and means to enable said traction member to follow the course of the front wheels of said running gear.

23. The combination, in a traction device, with a vehicle frame, a member carried by said frame and arranged to move on an approximately horizontal plane, an approximately vertical pivotal support for said member, and a driving shaft also carried by said frame, of a traction member and an axle therefor, a driving member on said axle, housing members affording bearings for said axle, a flexible connection between said pivotal support and said housing members, driving members in said housing members, for said axle driving member, a flexible connection between said shaft and said driving members in said housing members, and yielding means, between said first-mentioned member and said axle, to retain said traction member forcibly on the ground.

HARRY C. NAIL.
HARRY T. BARWELL.

Witnesses:
W. HEINGARTNER,
EDWARD BULL.